United States Patent
Tanno (10) Patent No.: US 10,808,602 B2
(45) Date of Patent: Oct. 20, 2020

(54) INTERNAL COMBUSTION ENGINE

(71) Applicant: TOYOTA JIDOSHA KABUSHIKI KAISHA, Toyota-shi (JP)

(72) Inventor: Shiro Tanno, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/260,297

(22) Filed: Jan. 29, 2019

(65) Prior Publication Data

US 2019/0242295 A1    Aug. 8, 2019

(30) Foreign Application Priority Data

Feb. 7, 2018    (JP) .................................. 2018-020290

(51) Int. Cl.
| | |
|---|---|
| *F02B 23/06* | (2006.01) |
| *F02B 3/06* | (2006.01) |
| *F02B 23/10* | (2006.01) |
| *F02M 61/14* | (2006.01) |
| *F02M 61/18* | (2006.01) |

(52) U.S. Cl.
CPC ............ *F02B 23/0651* (2013.01); *F02B 3/06* (2013.01); *F02B 23/10* (2013.01); *F02M 61/14* (2013.01); *F02M 61/1813* (2013.01)

(58) Field of Classification Search
CPC ........ F02B 23/06; F02B 23/0651; F02B 3/06; F02B 23/10; F02M 61/14; F02M 61/1813
See application file for complete search history.

(56) References Cited

U.S. PATENT DOCUMENTS

| | | | | |
|---|---|---|---|---|
| 4,635,597 A | * | 1/1987 | Ohashi ................ | F02B 23/0651 123/263 |
| 5,029,563 A | * | 7/1991 | Hu .......................... | F02B 19/04 123/262 |
| 6,390,059 B1 | * | 5/2002 | Shiraishi ............... | F02B 17/005 123/298 |
| 2016/0097360 A1 | | 4/2016 | Mueller | |

FOREIGN PATENT DOCUMENTS

| | | | | |
|---|---|---|---|---|
| CN | 106795802 A | | 5/2017 | |
| DE | 43 05 538 A1 | | 8/1994 | |
| EP | 3 594 487 A2 | * | 1/2020 | .......... F02B 23/0651 |
| JP | 2009024637 A | * | 2/2009 | ............. F02B 23/10 |
| JP | 2013-092103 | | 5/2013 | |
| JP | 2017-530298 | | 10/2017 | |

* cited by examiner

*Primary Examiner* — Hieu T Vo
(74) *Attorney, Agent, or Firm* — Oblon, McClelland, Maier & Neustadt, L.L.P.

(57) ABSTRACT

An internal combustion engine includes a fuel injection nozzle that is arranged at the center of an upper surface of a combustion chamber with an injection port thereof exposed in the combustion chamber, and a piston arranged in a cylinder. On a top surface of the piston, a flow guide passage is provided which extends from an inlet exposed on the side of a wall of a bore of the cylinder to an outlet exposed on the side of a center of the bore. The flow guide passage preferably includes a flow guide plate having a ring shape, and a strut that fixes the flow guide plate to the top surface of the piston in such a manner that a clearance extending from an outer edge to an inner edge of the flow guide plate is formed between the flow guide plate and the top surface of the piston.

6 Claims, 9 Drawing Sheets

INTERNAL COMBUSTION ENGINE

CROSS-REFERENCE TO RELATED APPLICATION

The present disclosure claims priority under 35 U.S.C. § 119 to Japanese Patent Applications No. 2018-020290, filed on Feb. 7, 2018. The contents of this application are incorporated herein by reference in their entirety.

FIELD

The present disclosure relates to an internal combustion engine. More specifically, the present disclosure relates to a compression ignition internal combustion engine in which combustion of fuel is achieved by directly injecting the fuel into a combustion chamber in which air is compressed.

BACKGROUND

For example, JP 2017-530298 A discloses a technique of promoting premixing of fuel and air in a combustion chamber of a compression ignition internal combustion engine. According to the technique, a duct, which is a hollow tube, is arranged close to an opening at a tip end of a fuel injection device that is exposed in the combustion chamber. Fuel injected from the opening passes through the hollow tube into the combustion chamber. The fuel and air are premixed as the injected fuel passes through the hollow tube. As a result, the fuel is more uniformly distributed in the combustion chamber, and therefore smoke is less likely to occur.

As another example, JP 2013-92103 A discloses a compression ignition internal combustion engine provided with a flow guide passage fixed at a tip end of a fuel injection nozzle that is exposed in a combustion chamber. A spray of fuel injected from the fuel injection nozzle passes through the flow guide passage. As a result, the injected fuel is less likely to be dispersed, and therefore, the amounts of NOx and soot in the exhaust gas are reduced.

SUMMARY

According to the conventional techniques described above, a projecting part such as the duct or flow guide passage is suspended in the combustion chamber. The interior of the combustion chamber is subjected to high temperature and high pressure. Therefore, if a structure has a suspended projecting part in the combustion chamber, the projecting part may drop, and therefore the structure has a problem in terms of reliability.

The present disclosure has been made in view of the problem described above. An object of the present disclosure is to provide a reliable compression ignition internal combustion engine that can prevent occurrence of smoke without any suspended projecting part in a combustion chamber.

To attain the object described above, a first aspect of the present disclosure is an internal combustion engine of a compression ignition type in which combustion of a fuel is achieved by injecting the fuel into a combustion chamber in which air is compressed. The internal combustion engine includes a fuel injection nozzle that has an injection port through which the fuel is injected, and is arranged at a center of an upper surface of the combustion chamber with the injection port thereof exposed in the combustion chamber, a piston arranged in a cylinder, and a flow guide passage that is arranged on a top surface of the piston and extends from an inlet exposed on the side of a wall of a bore of the cylinder to an outlet exposed on the side of a center of the bore.

A second aspect of the present disclosure has the following feature in the first aspect.

The flow guide passage may include a flow guide plate having a ring shape, and a strut that fixes the flow guide plate to the top surface of the piston in such a manner that a clearance extending from an outer edge to an inner edge of the flow guide plate is formed between the flow guide plate and the top surface of the piston.

A third aspect of the present disclosure has the following feature in the second aspect.

The flow guide plate may be configured so that the clearance between the flow guide plate and the top surface of the piston becomes wider as it goes from the outer edge to the inner edge.

A fourth aspect of the present disclosure has the following feature in the second aspect.

The fuel injection nozzle may be configured so that a fuel spray injected from the injection port flows along an upper surface of the flow guide plate. The flow guide plate may have a recessed part that is recessed to the side of the piston and extends along an injection port axis of the fuel spray injected from the injection port.

A fifth aspect of the present disclosure has the following feature in the first aspect.

The flow guide passage may have a through-hole that extends through the piston from the inlet exposed on the side of the wall of the bore of the cylinder to the outlet exposed on the side of the center of the bore.

A sixth aspect of the present disclosure has the following feature in the first aspect.

The fuel injection nozzle may have a plurality of injection ports having different injection directions. A plurality of flow guide passages may be provided for the plurality of injection ports.

According to the first aspect, the flow guide passage is arranged on the top surface of the piston and extends from the inlet exposed on the side of the wall of the bore of the cylinder to the outlet exposed on the side of the center of the bore. With such a configuration, fresh air at relatively low temperature can be prevented from being mixed with burnt gas at high temperature, and thus fresh air maintained at relatively low temperature can be fed to an upstream part of the fuel spray. Therefore, the fuel spray injected from the fuel injection nozzle is dispersed while being premixed with the fresh air at relatively low temperature, so that ignition of a rich fuel spray, which is not sufficiently premixed with air, can be prevented. Therefore, smoke can be reduced, and the afterburning period can be reduced to improve the thermal efficiency.

According to the second aspect, the flow guide plate having a ring shape is fixed to the top surface of the piston with a clearance therebetween. With such a configuration, the clearance between the top surface of the piston and the flow guide plate functions as a flow guide passage. Therefore, a flow guide passage can be formed on the top surface of the piston with a simple configuration.

Assuming that the distance between the flow guide plate having a ring shape and the top surface of the piston is uniform, the opening area of the inlet is larger than the opening area of the outlet. In this case, the flow guide passage becomes narrower as it goes from the inlet to the outlet, so that distribution of fresh air is inhibited. According to the third aspect, the flow guide plate is configured so that the clearance between the flow guide plate and the top surface of the piston becomes wider as it goes from the side of the wall of the bore to the side of the center of the bore. Therefore, the flow guide passage is not significantly narrowed, so that fresh air can be smoothly distributed in the flow guide passage.

According to the fourth aspect, the fuel injection nozzle is configured so that the fuel spray injected from the injection port flows along the upper surface of the flow guide plate. And the flow guide plate has the recessed part that is recessed to the side of the piston and extends along the injection port axis of the fuel spray injected from the injection port. Therefore, the fuel spray injected from the injection port flows along the recessed part formed in the upper surface of the flow guide plate, and the fuel spray is prevented from adhering to the flow guide plate.

According to the fifth aspect, the flow guide passage is formed to extend through the piston. Therefore, the flow guide passage can be formed by simple machining. In addition, no separate part needs to be fixed to the piston, so that the reliability can also be improved.

According to the sixth aspect, the fuel injection nozzle has the plurality of injection ports having different injection directions, and the plurality of flow guide passages is provided for the plurality of injection ports. With such a configuration, premixing of the fuel injected from each of the plurality of injection ports can be promoted.

DESCRIPTION OF EMBODIMENTS

In the following, embodiments of the present disclosure will be described with reference to the drawings. In the description of the embodiments below, any mention of a numerical value such as the number, quantity, amount or range of an entity is not intended to limit the present disclosure to the numerical value unless otherwise specified or unless it is obvious that the numerical value is identified in principle. In addition, any structure described in the embodiments below is not essential for the present disclosure unless otherwise specified or unless it is obvious that the structure is identified in principle.

First Embodiment

A first embodiment will be described with reference to the drawings.

1-1. Configuration of First Embodiment

Figure 1:
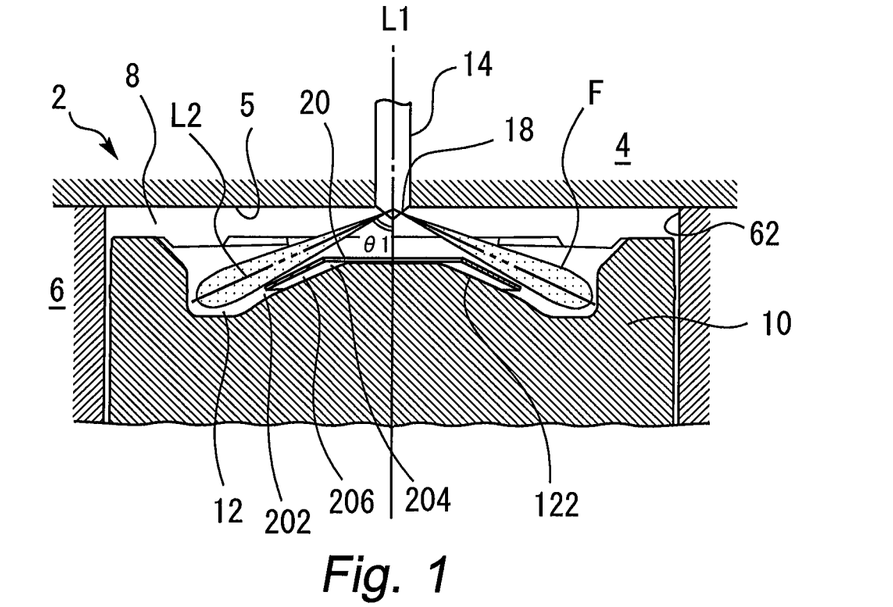
FIG. 1 is a schematic cross-sectional view of an internal combustion engine according to a first embodiment.

FIG. 1 is a schematic cross-sectional view of an internal combustion engine according to the first embodiment. The internal combustion engine according to the first embodiment is a compression ignition internal combustion engine (also referred to simply as an engine, hereinafter) mounted on a mobile body such as a vehicle. Note that FIG. 1 shows an internal structure of one of a plurality of cylinders of an engine 2.

As shown in FIG. 1, the engine 2 includes a cylinder head 4 and a cylinder block 6. A cylinder 62 is formed in the cylinder block 6. A piston 10 is arranged in the cylinder 62. A combustion chamber 8 is formed in a space defined by the cylinder head 4, the cylinder 62 and a top surface of the piston 10. A cavity 12 is formed in a central part of the piston 10. The cavity 12 is also a part of the combustion chamber 8.

An intake valve and an exhaust value (both not shown) are arranged in an upper surface part 5 of the cylinder head 4 forming the combustion chamber 8. A fuel injection nozzle 14 is arranged at the center of the upper surface part 5. More specifically, the fuel injection nozzle 14 is fixed to the cylinder head 4 with a central axis aligned with a cylinder central axis L1 in such a manner that an injection port 18 provided at a tip end part thereof is exposed in the combustion chamber 8. In the following description, the direction along the cylinder central axis L1 in which the piston 10 moves toward the cylinder head 4 will be referred to as an upward direction, and the direction in which the piston 10 moves away from the cylinder head 4 will be referred to as a downward direction.

The fuel injection nozzle 14 according to the first embodiment has eight injection ports 18 so that the fuel is uniformly radially injected to a wall of a bore of the cylinder 62. Each injection port 18 is formed in such a manner that an angle θ1 formed by the cylinder central axis L1 and an injection port axis L2, which indicate the direction of injection of a fuel spray F, falls within a range of 45° and 90°.

The engine 2 according to the first embodiment is characterized by including a flow guide plate 20. The flow guide plate 20 is fixed to the piston 10 at a predetermined distance from the cavity 12 formed in the top surface of the piston 10. In the following, a configuration of the piston 10 with the flow guide plate 20 fixed thereto will be described in more detail with reference to FIGS. 2 to 5.

Figure 2:
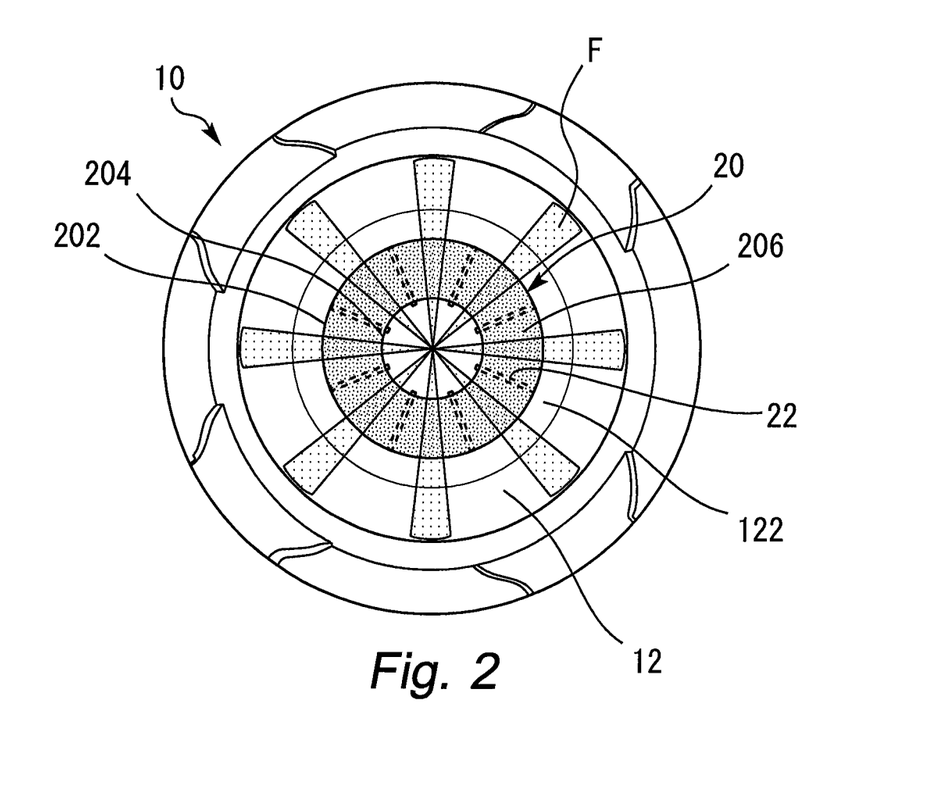
FIG. 2 is a top view of a piston according to the first embodiment with a flow guide plate fixed thereto.
Figure 3:
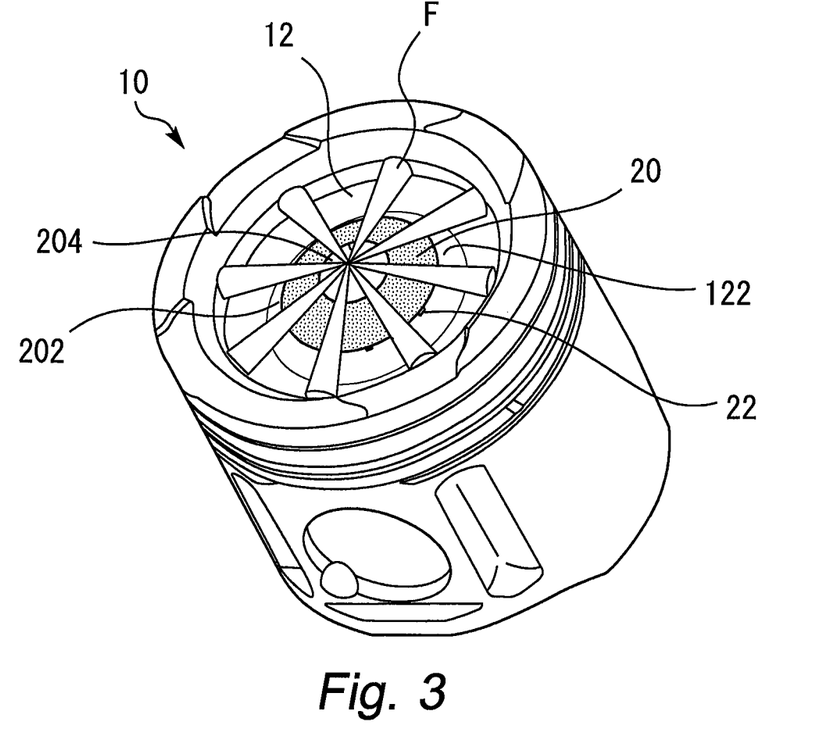
FIG. 3 is a perspective view of the piston according to the first embodiment with the flow guide plate fixed thereto.
Figure 4:
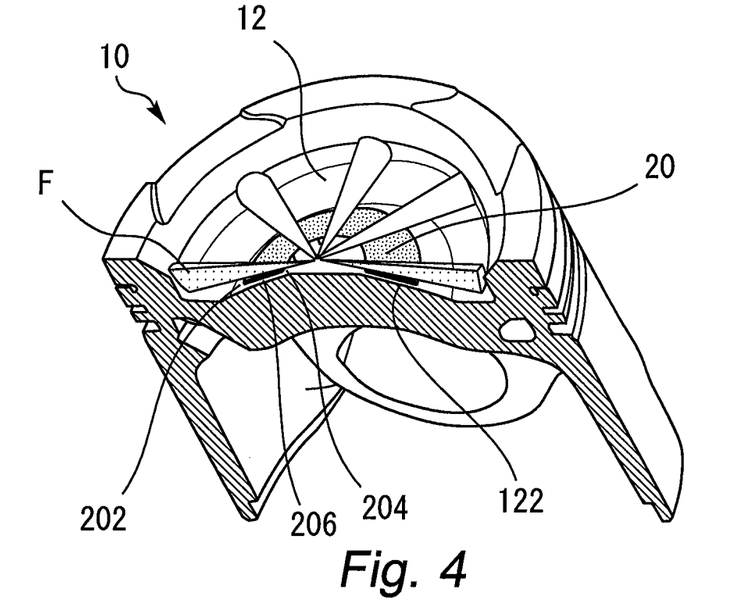
FIG. 4 is a perspective cross-sectional view of the piston according to the first embodiment with the flow guide plate fixed thereto taken along a plane including a cylinder central axis.
Figure 5:
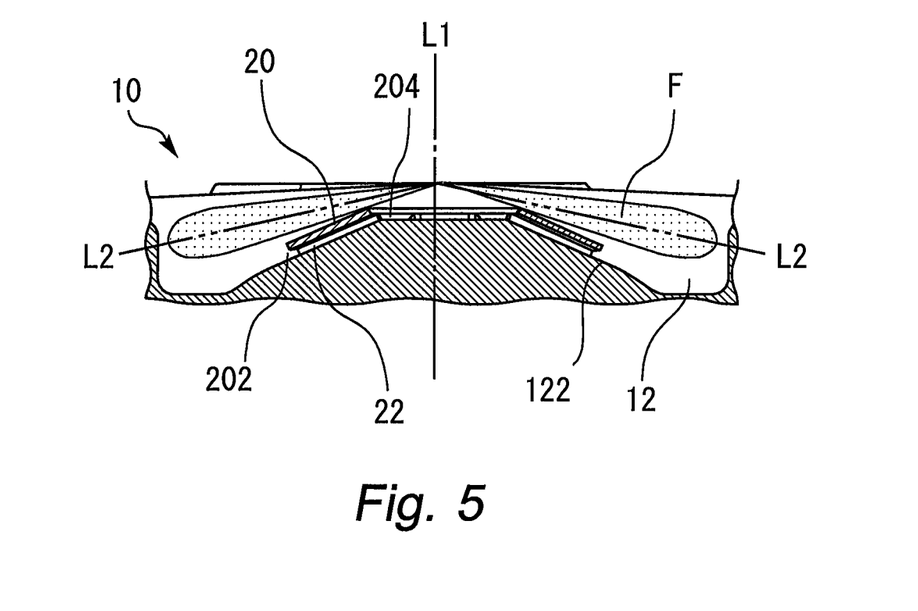
FIG. 5 is a partially enlarged cross-sectional side view of the piston according to the first embodiment with the flow guide plate fixed thereto taken along the plane including the cylinder central axis.

FIG. 2 is a top view of the piston according to the first embodiment with the flow guide plate fixed thereto. FIG. 3 is a perspective view of the piston according to the first embodiment with the flow guide plate fixed thereto. FIG. 4 is a perspective cross-sectional view of the piston according to the first embodiment with the flow guide plate fixed thereto taken along a plane including the cylinder central axis. FIG. 5 is a partially enlarged cross-sectional side view of the piston according to the first embodiment with the flow guide plate fixed thereto taken along the plane including the cylinder central axis.

As shown in these drawings, the flow guide plate 20 has the shape of a circular conical ring and covers a conical surface 122 of the cavity 12 that is downwardly inclined in the outward direction of the piston 10. The flow guide plate 20 extends at a constant distance from the conical surface 122 and is fixed to the piston 10 by struts 22.

The struts 22 radially extend between adjacent fuel sprays F from an inner edge toward an outer edge of the flow guide plate 20 having the circular conical ring shape. Therefore, below the fuel spray F, a flow guide passage 206 having an inlet 202 on the outer edge side (that is, the side of the wall of the bore of the cylinder 62) and an outlet 204 on the inner edge side (that is, the side of the center of the bore of the cylinder 62) is formed in the clearance between the flow guide plate 20 and the conical surface 122.

1-2. Characteristics of First Embodiment

Figure 6:
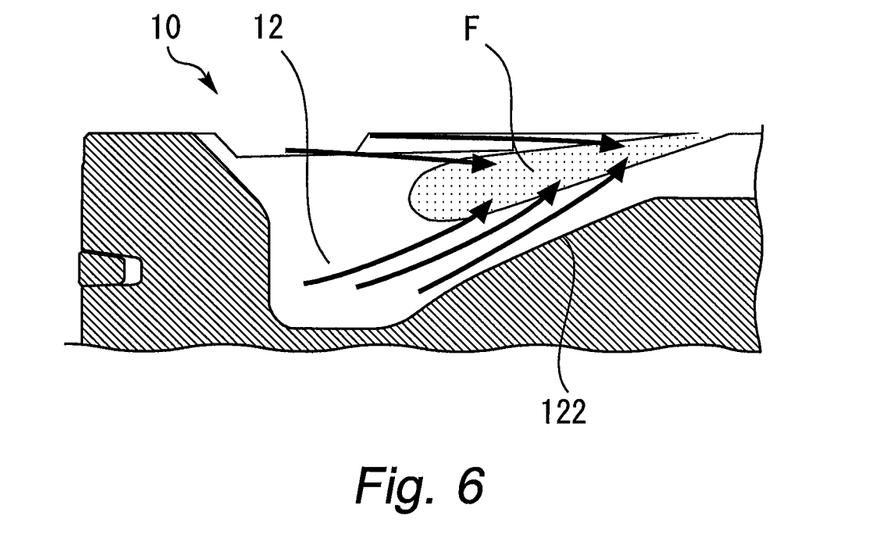
FIG. 6 is a schematic diagram for illustrating a flow of air in a combustion chamber of an engine having a piston without any flow guide plate according to a comparative example.
Figure 7:
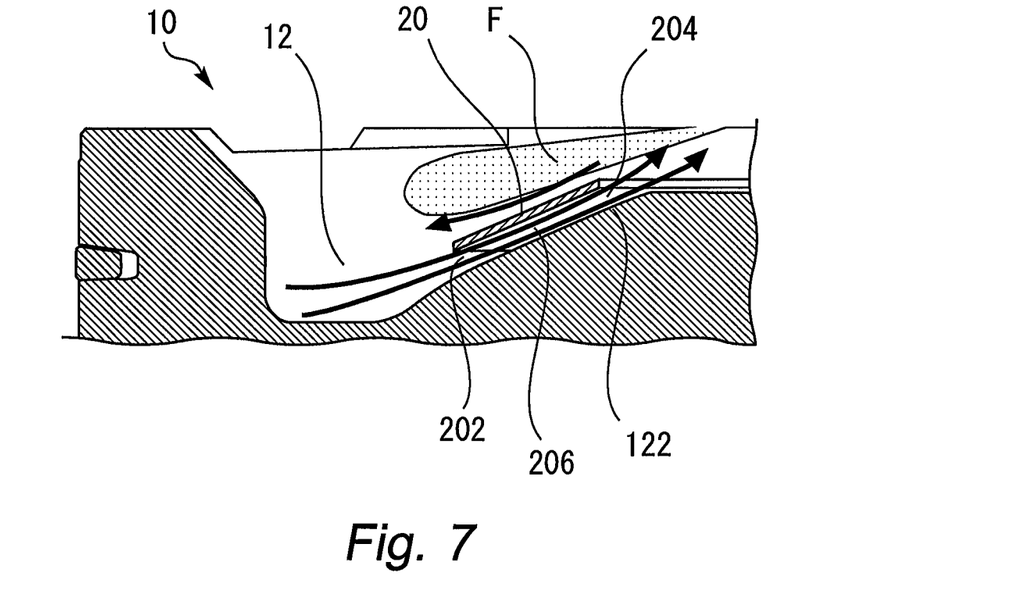
FIG. 7 is a schematic diagram for illustrating a flow of air in a combustion chamber of the engine having the piston according to the first embodiment with the flow guide plate fixed thereto.

Next, with reference to FIGS. 6 and 7, effects and advantages of the flow guide plate 20 that characterizes the first embodiment will be described. FIG. 6 is a schematic diagram for illustrating a flow of air in a combustion chamber of an engine having a piston without any flow guide plate according to a comparative example. FIG. 7 is a schematic diagram for illustrating a flow of air in the combustion chamber of the engine having the piston according to the first embodiment with the flow guide plate fixed thereto.

First, the flow of air in a combustion chamber of an engine 2 having a piston 10 without the flow guide plate 20 according to the comparative example will be described. As shown in FIG. 6, in the engine 2 without the flow guide plate 20, fresh air in the combustion chamber 8 is taken in an upstream part of the fuel spray F while being mixed with burnt gas at high temperature. In this case, since the fuel spray F is mixed with the burnt gas at high temperature after ignition, the injected fuel can ignite too early. Thus, problems can occur, such as occurrence of smoke as a result of combustion of rich fuel or a decrease in thermal efficiency as a result of extension of the afterburning period.

As a means of solving the problems described above, the engine 2 according to the first embodiment has the piston 10 provided with the flow guide plate 20. As shown in FIG. 7, the flow guide passage 206 is formed in the clearance between the conical surface 122 of the piston 10 and the flow guide plate 20. The fuel spray F injected from the fuel injection nozzle 14 is dispersed into the cavity 12 along an upper surface of the flow guide plate 20. In this process, fresh air in the combustion chamber 8 is introduced into the flow guide passage 206 through the inlet 202. The flow guide passage 206 is isolated from the fuel spray F by the flow guide plate 20. Therefore, the fresh air introduced in the flow guide passage 206 through the inlet 202 is not mixed with much burnt gas at high temperature and exits the outlet 204. As a result, the fresh air maintained at low temperature is taken in an upstream part of the fuel spray F, and it takes a certain time for the injected fuel to ignite. Therefore, combustion of rich fuel can be prevented, and occurrence of smoke or a decrease in thermal efficiency as a result of extension of the afterburning period can be prevented.

Furthermore, since the engine 2 according to the first embodiment has the flow guide passages 206 for the downstream parts of the fuel sprays F, the fresh air at low temperature exiting the outlet 204 can be efficiently taken in the upstream part of the fuel sprays F.

Furthermore, with the engine 2 according to the first embodiment, the angle θ1 formed by the injection port axis L2 and the cylinder central axis L1 is set in the range of 45° to 90°. Therefore, a decrease in spray penetration can be prevented.

1-3. Modifications of First Embodiment

The engine 2 according to the first embodiment may be modified as described below.

Figure 8:
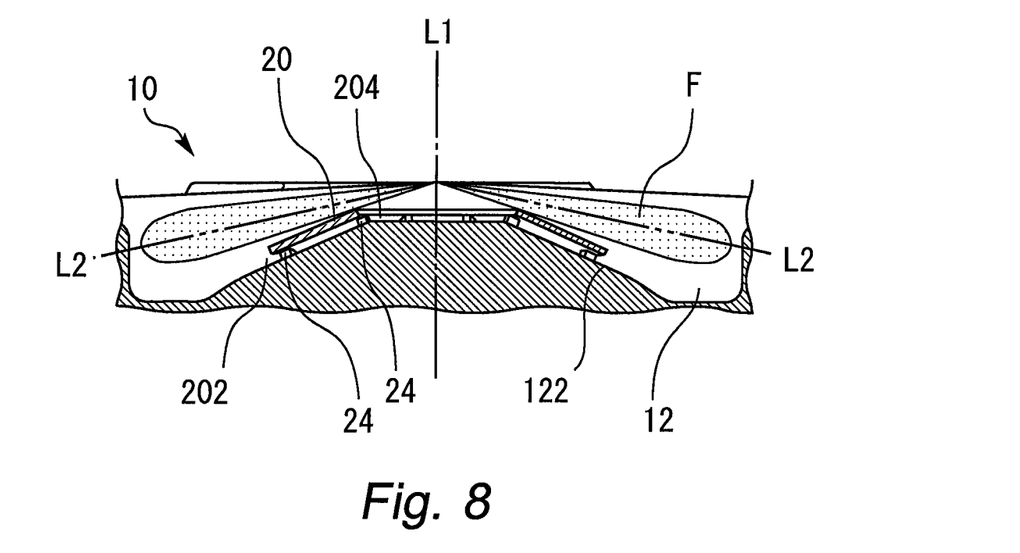
FIG. 8 is a diagram for illustrating an engine according to a modification of the first embodiment.

The shape of the strut 22 that fixes the flow guide plate 20 is not limited to that shown in FIG. 5. FIG. 8 is a diagram for illustrating an engine according to a modification of the first embodiment. In the modification shown in FIG. 8, struts 24 for fixing the flow guide plate 20 to the piston 10 are provided at a location near the inner edge and a location near the outer edge of the flow guide plate 20. With such a configuration, adjacent flow guide passages 206 are in communication with each other in middle parts thereof, so that inhibition of a swirl in the cavity 12 can be reduced. The same holds true for the other embodiments described later.

The shape of the flow guide plate 20 is not limited to the circular conical ring shape. The flow guide plate 20 can have any ring shape such as a polygonal (such as octagonal) ring shape as far as the inlet 202 is formed on the outer edge side and the outlet 204 is formed on the inner edge side. The same holds true for the other embodiments described later.

Second Embodiment

A second embodiment will be described with reference to the drawings.

2-1. Characteristics of Second Embodiment

Figure 9:
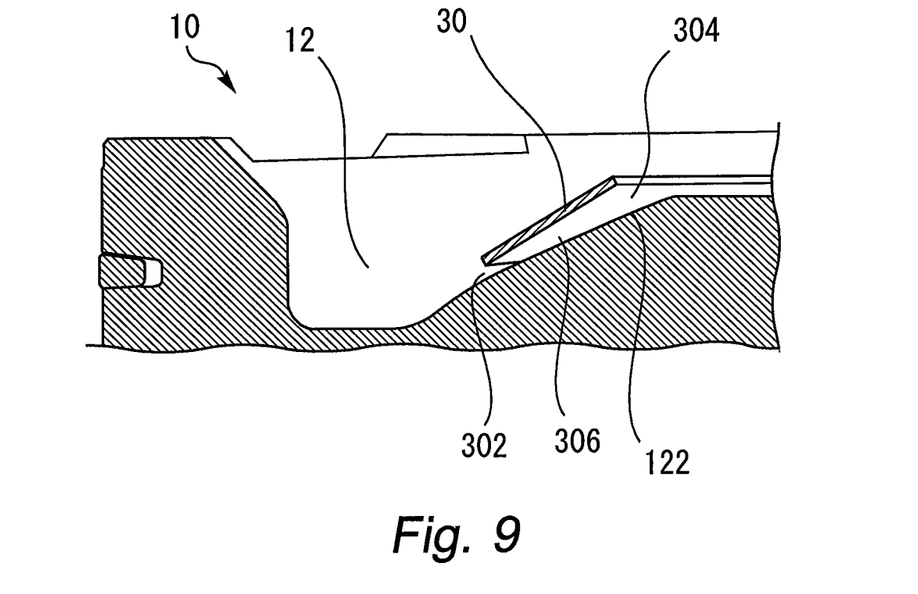
FIG. 9 is a partially enlarged cross-sectional side view of a piston of an engine according to a second embodiment taken along a plane including the cylinder central axis.

FIG. 9 is a partially enlarged cross-sectional side view of a piston of an engine according to the second embodiment taken along a plane including the cylinder central axis L1. In FIG. 9, the same components as those in FIGS. 1 to 8 are denoted by the same reference numerals, and detailed descriptions thereof will be omitted.

In the engine 2 according to the first embodiment described above, the flow guide plate 20 extends at a constant distance from the conical surface 122. With such a configuration, the opening area of the inlet 202 is larger than the opening area of the outlet 204. Therefore, the flow guide passage 206 becomes narrower as it goes from the inlet 202 to the outlet 204, so that distribution of fresh air is inhibited.

A flow guide plate 30 according to the second embodiment is arranged so that the distance from the conical surface 122 gradually increases as it goes from an inlet 302 to an outlet 304. With such a configuration, a flow guide passage 306 is not significantly narrowed, so that fresh air introduced through the inlet 302 can smoothly exit the outlet 304.

Third Embodiment

A third embodiment will be described with reference to the drawings.

3-1. Characteristics of Third Embodiment

Figure 10:
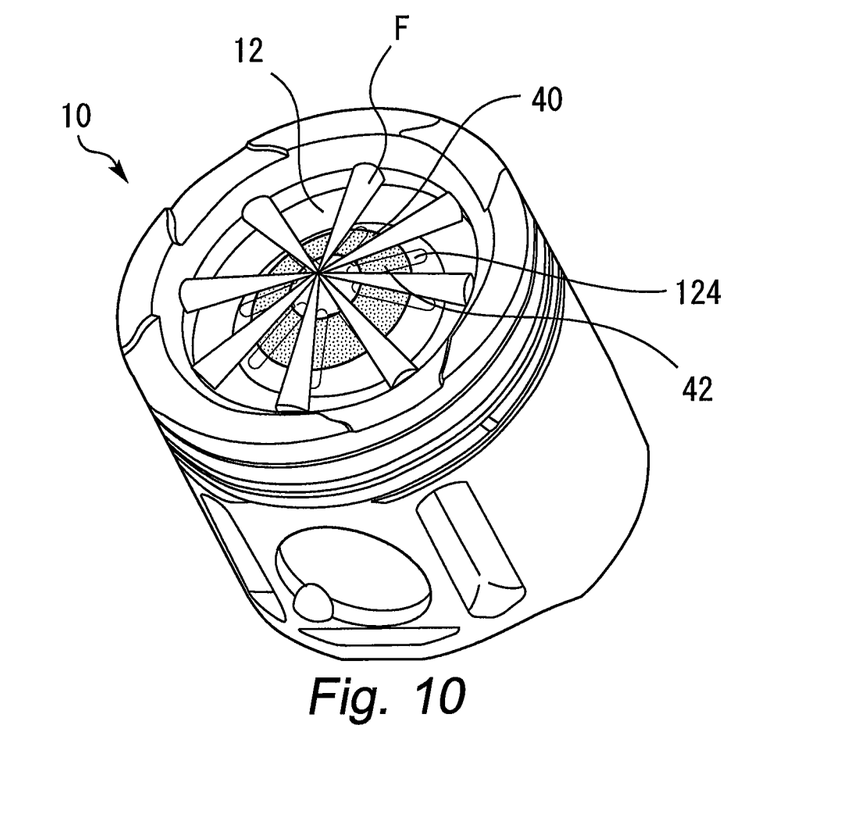
FIG. 10 is a perspective view of a piston according to a third embodiment with a flow guide plate fixed thereto.
Figure 11:
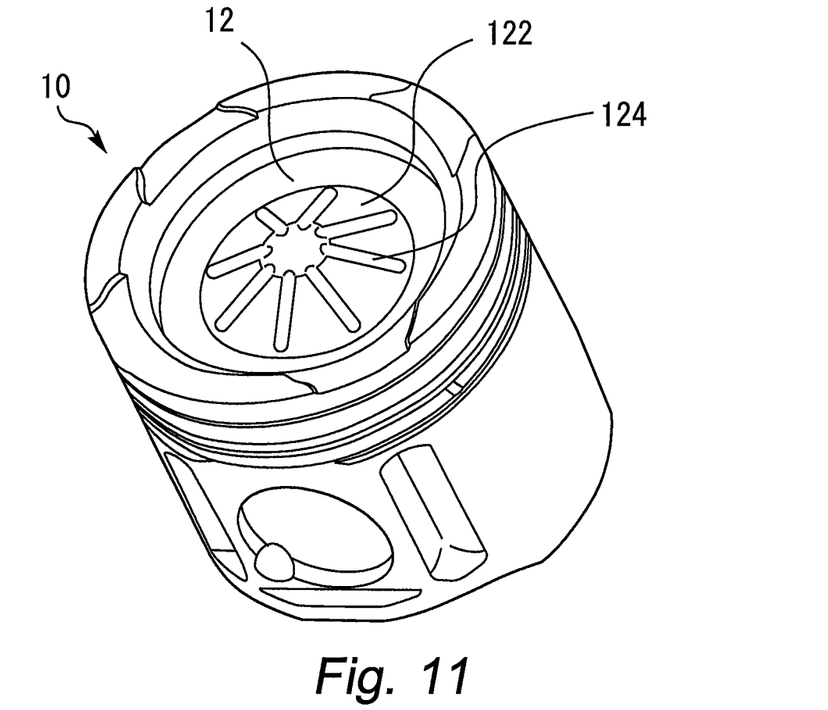
FIG. 11 is a perspective view of the piston according to the third embodiment alone.
Figure 12:
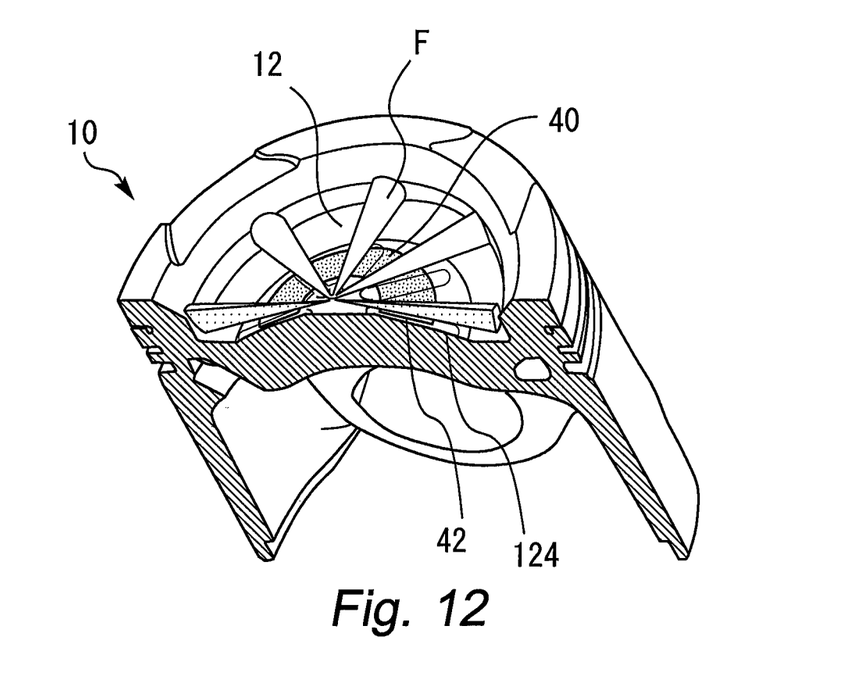
FIG. 12 is a perspective cross-sectional view of the piston according to the third embodiment with the flow guide plate fixed thereto taken along the plane including the cylinder central axis.
Figure 13:
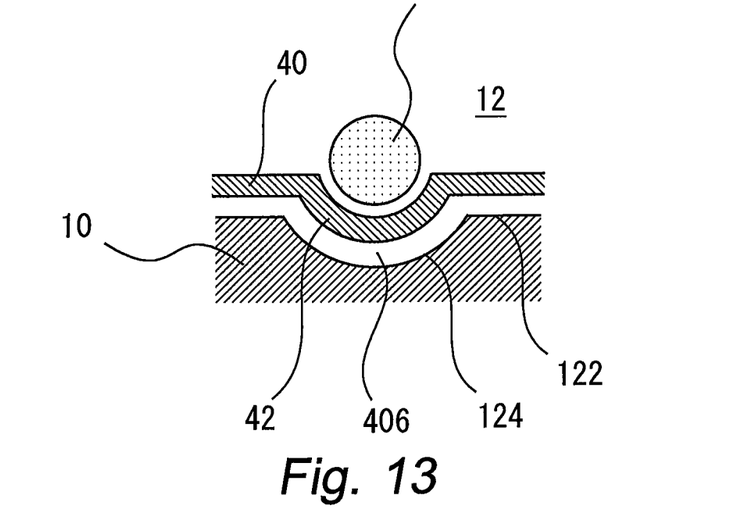
FIG. 13 is a partially enlarged cross-sectional view of the piston according to the third embodiment with the flow guide plate fixed thereto taken along a plane perpendicular to an injection port axis.

FIG. 10 is a perspective view of a piston according to the third embodiment with a flow guide plate fixed thereto. FIG. 11 is a perspective view of the piston according to the third embodiment alone. FIG. 12 is a perspective cross-sectional view of the piston according to the third embodiment with the flow guide plate fixed thereto taken along the plane including the cylinder central axis. FIG. 13 is a partially enlarged cross-sectional view of the piston according to the third embodiment with the flow guide plate fixed thereto taken along a plane perpendicular to the injection port axis. In FIGS. 10 to 13, the same components as those in FIGS. 1 to 8 are denoted by the same reference numerals, and detailed descriptions thereof will be omitted.

As shown in these drawings, a flow guide plate 40 has a recessed part 42 that is recessed downward and extends along the fuel spray F flowing along the upper surface of the flow guide plate. For example, in the cross section taken along a plane perpendicular to the injection port axis L2, the opposite surfaces of the recessed part 42 are concentric arcs about the injection port axis L2. The conical surface 122 of the piston 10 also has a recessed part 124 that is recessed downward and extends along the recessed part 42. For example, in the cross section taken along the plane perpendicular to the injection port axis L2, the opposite surfaces of the recessed part 142 are also concentric arcs about the injection port axis L2.

With the piston 10 and the flow guide plate 40 according to the third embodiment configured as described above, the recessed part 42 of the flow guide plate 40 prevents the fuel spray F from adhering to the flow guide plate 40. In addition, since the recessed part 124 is formed in the conical surface 122 of the piston 10, a clearance serving as a flow guide passage 406 can be provided between the recessed part 42 of the flow guide plate 40 and the recessed part 124 of the conical surface 122.

3-2. Modification of Third Embodiment

The engine 2 according to the third embodiment may be modified as described below.

The shape of the recessed part 42 formed in the flow guide plate 40 is not limited to that described above. The recessed part 42 can have any other shape as far as it is recessed downward and reduces the degree of contact between the fuel spray F and the flow guide plate 40. The recessed part 142 can have any shape as far as there is a clearance serving as the flow guide passage 406 between the recessed part 42 of the flow guide plate 40 and the recessed part 124 of the conical surface 122. The recessed part 124 of the conical surface 122 may be omitted if a clearance serving as the flow guide passage 406 can be provided between the recessed part 42 of the flow guide plate 40 and the conical surface 122 without the recessed part 142.

Fourth Embodiment

A fourth embodiment will be described with reference to the drawings.

4-1. Characteristics of Fourth Embodiment

Figure 14:
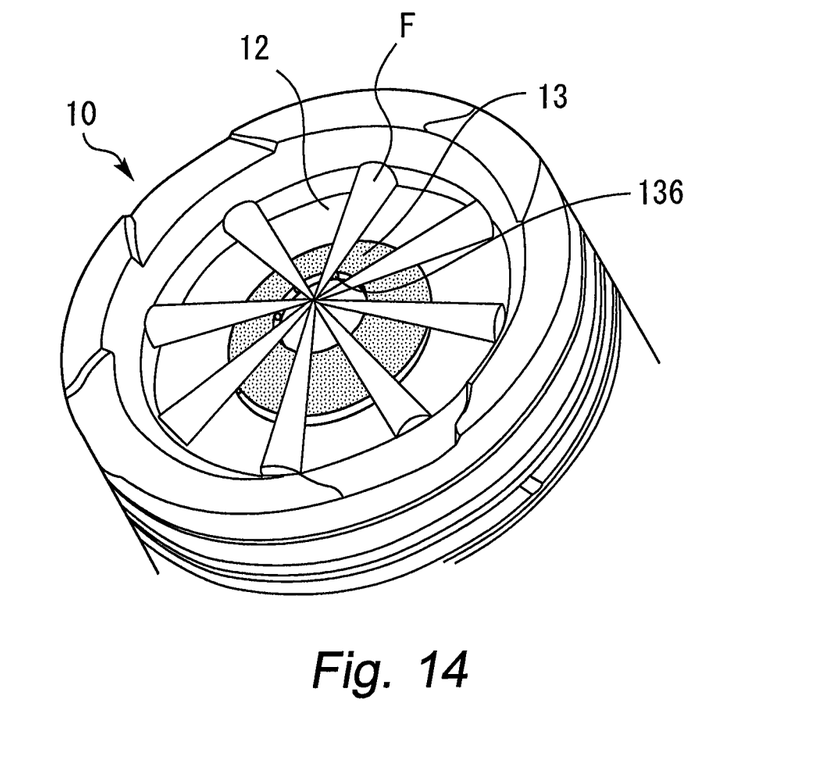
FIG. 14 is a perspective view of a piston of an engine according to a fourth embodiment.
Figure 15:
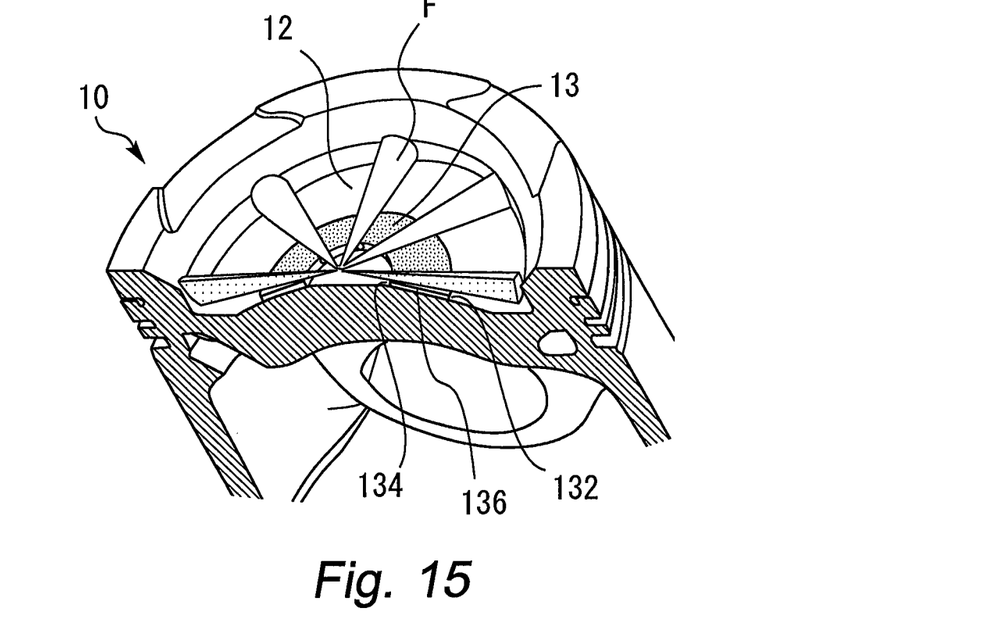
FIG. 15 is a perspective cross-sectional view of the piston of the engine according to the fourth embodiment taken along the plane including the cylinder central axis.
Figure 16:
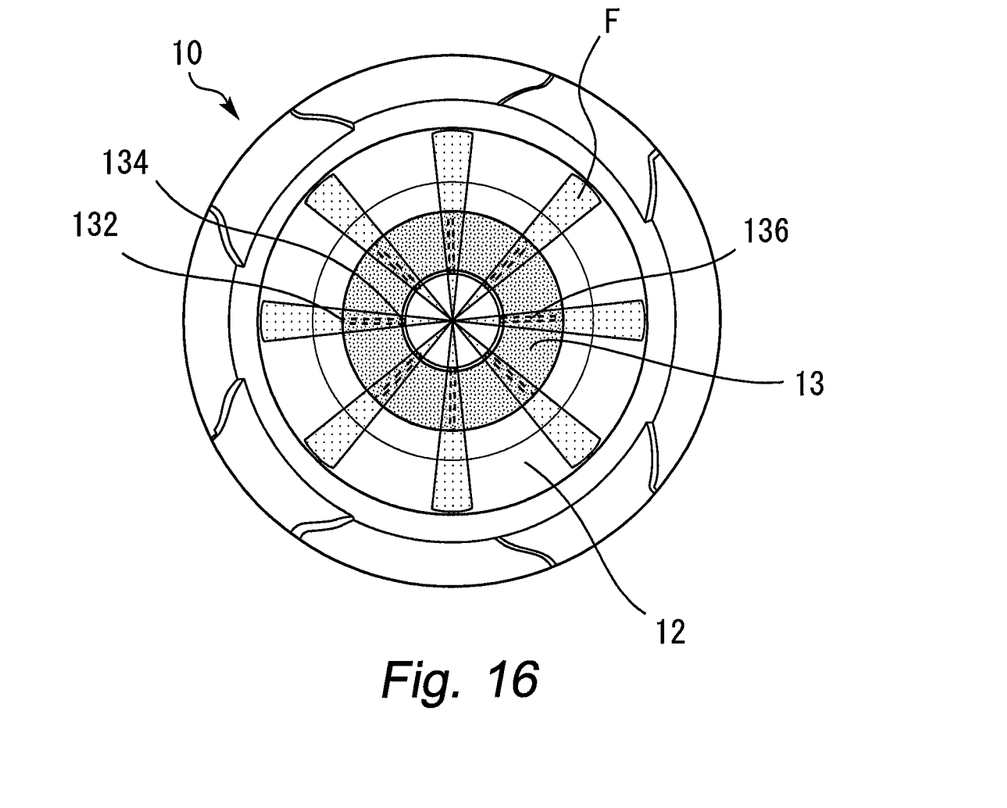
FIG. 16 is a top view of the piston of the engine according to the fourth embodiment.
Figure 17:
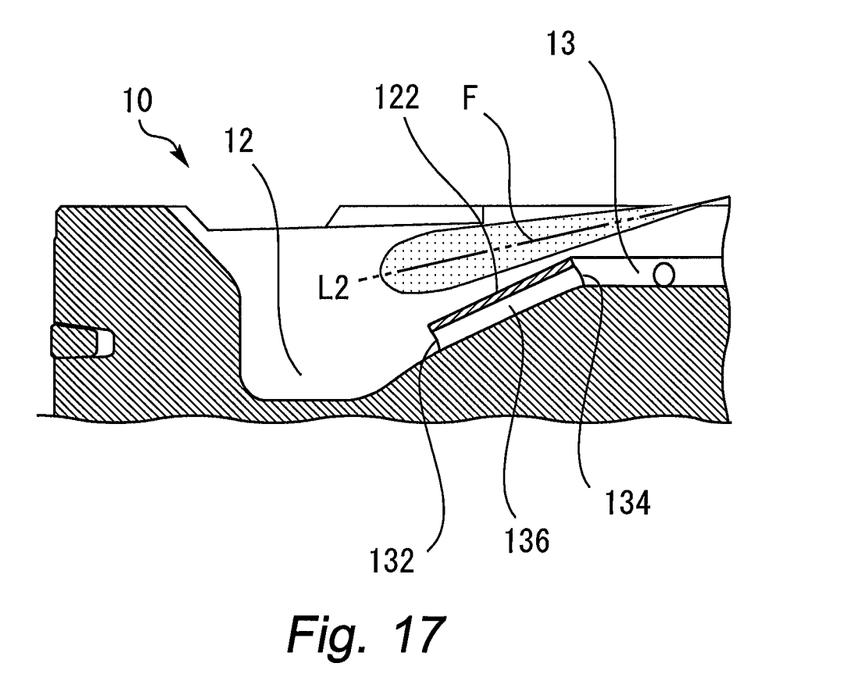
FIG. 17 is a partially enlarged cross-sectional view of the piston of the engine according to the fourth embodiment taken along a plane including the injection port axis.

FIG. 14 is a perspective view of a piston of an engine according to the fourth embodiment. FIG. 15 is a perspective cross-sectional view of the piston of the engine according to the fourth embodiment taken along the plane including the cylinder central axis. FIG. 16 is a top view of the piston of the engine according to the fourth embodiment. FIG. 17 is a partially enlarged cross-sectional view of the piston of the engine according to the fourth embodiment taken along a plane including the injection port axis. In FIGS. 14 to 17, the same components as those in FIGS. 1 to 8 are denoted by the same reference numerals, and detailed descriptions thereof will be omitted.

The engine 2 according to the fourth embodiment is characterized in that a through-hole 136 serving as a flow guide passage is directly formed in the cavity 12 of the piston 10. More specifically, as shown in these drawings, the piston 10 according to the fourth embodiment is provided with a flow guide passage forming part 13 having a circular ring shape extruding in the cavity 12. The flow guide passage forming part 13 is integrally formed with the piston 10, and an upper surface of the flow guide passage forming part 13 serves as the conical surface 122.

The through-hole 136 is formed by machining in the flow guide passage forming part 13 and has an inlet 132 on the outer edge side and an outlet 134 on the inner edge side. More specifically, a plurality of radial through-holes 136 is provided at the same locations as the fuel sprays F in the top view of the piston 10. The through-hole 136 may have a circular cross section or other cross sections such as an elliptic cross section.

The through-hole 136 configured as described above functions as a flow guide passage through which fresh air at low temperature is fed to the upstream part of the fuel spray F. Therefore, with the piston 10 according to the fourth embodiment, the fresh air at low temperature exiting the outlet 134 can be efficiently taken in the upstream part of the fuel spray F. In addition, since the through-hole 136 can be formed in the piston 10 by machining, the manufacturability can be improved.

What is claimed is:

1. An internal combustion engine of a compression ignition type in which combustion of a fuel is achieved by injecting the fuel into a combustion chamber in which air is compressed, the internal combustion engine comprising:
   a fuel injection nozzle that has an injection port through which the fuel is injected, and is arranged at a center of an upper surface of the combustion chamber with the injection port thereof exposed in the combustion chamber;
   a piston arranged in a cylinder; and
   a flow guide passage that is arranged on a top surface of the piston and extends from an inlet exposed on the side of a wall of a bore of the cylinder to an outlet exposed on the side of a center of the bore.

2. The internal combustion engine according to claim 1, wherein the flow guide passage comprises:
   a flow guide plate having a ring shape; and
   a strut that fixes the flow guide plate to the top surface of the piston in such a manner that a clearance extending from an outer edge to an inner edge of the flow guide plate is formed between the flow guide plate and the top surface of the piston.

3. The internal combustion engine according to claim 2, wherein the flow guide plate is configured so that the clearance between the flow guide plate and the top surface of the piston becomes wider as it goes from the outer edge to the inner edge.

4. The internal combustion engine according to claim 2, wherein the fuel injection nozzle is configured so that a fuel spray injected from the injection port flows along an upper surface of the flow guide plate, and
   the flow guide plate has a recessed part that is recessed to the side of the piston and extends along an injection port axis of the fuel spray injected from the injection port.

5. The internal combustion engine according to claim 1, wherein the flow guide passage has a through-hole that extends through the piston from the inlet exposed on the side of the wall of the bore of the cylinder to the outlet exposed on the side of the center of the bore.

6. The internal combustion engine according to claim 1, wherein the fuel injection nozzle has a plurality of injection ports having different injection directions, and a plurality of flow guide passages is provided for the plurality of injection ports.

\* \* \* \* \*